United States Patent
Boudville

(10) Patent No.: US 9,679,072 B2
(45) Date of Patent: Jun. 13, 2017

(54) MOBILE PHOTO SHARING VIA BARCODE, SOUND OR COLLISION

(71) Applicant: Wesley John Boudville, Los Angeles, CA (US)

(72) Inventor: Wesley John Boudville, Los Angeles, CA (US)

(*) Notice: Subject to any disclaimer, the term of this patent is extended or adjusted under 35 U.S.C. 154(b) by 0 days.

(21) Appl. No.: 14/544,612

(22) Filed: Jan. 28, 2015

(65) Prior Publication Data

US 2016/0217217 A1   Jul. 28, 2016

(51) Int. Cl.
  *G06F 17/00* (2006.01)
  *G06F 17/30* (2006.01)
  *G06K 19/06* (2006.01)
  *G06Q 30/00* (2012.01)

(52) U.S. Cl.
  CPC .. *G06F 17/30879* (2013.01); *G06K 19/06037* (2013.01); *G06Q 30/00* (2013.01)

(58) Field of Classification Search
  CPC .......... G06F 17/30879; G06Q 20/3274; G06Q 20/3276
  USPC ........................................................ 235/375
  See application file for complete search history.

(56) References Cited

U.S. PATENT DOCUMENTS

| | | | |
|---|---|---|---|
| 8,531,414 B2 | 9/2013 | Huibers | |
| 8,532,632 B2 | 9/2013 | Boudville | |
| 8,577,292 B2 | 11/2013 | Huibers | |
| 8,821,277 B2 | 9/2014 | Boudville | |
| 9,010,622 B2 * | 4/2015 | Kim | .......... G06F 17/30879 235/375 |
| 2011/0101086 A1 * | 5/2011 | Yach | .......... G06Q 10/10 235/375 |
| 2012/0084131 A1 | 4/2012 | Bergel | |
| 2013/0130714 A1 | 5/2013 | Huibers | |
| 2013/0217335 A1 | 8/2013 | Huibers | |
| 2014/0098644 A1 | 4/2014 | Boudville | |
| 2014/0349746 A1 | 11/2014 | Boudville | |

* cited by examiner

*Primary Examiner* — Jamara Franklin

(57) ABSTRACT

Jane talks to Bob, who can be a stranger. She shows him photos on her mobile device. He wants a copy of a photo. Jane could work for a company that wants to promote its products. Her device has product images. She makes data with a link to the image, and her contact information. The data is in a barcode on her screen. Bob decodes the data. He gets her email address. His device replies with an auto-generated message. Her device gets his electronic address. Her device can send a message, offering a discount or extra features about the product. Another use lets Bob comment in text or speech about Jane's photo. His comment is added to the webpage that shows the photo. Other wireless means are possible. Including "chirp"—an identifier of the data is transmitted as audio. Or using accelerometers and geolocation on both devices. The invention permits the automated transmission of photos and contact information between people, with minimal manual steps. A company can use it to build a database of potential customers interested in their products. Another method lets Jane transmit her email address to Bob, who takes a photo of her and emails it to her.

20 Claims, 9 Drawing Sheets

```
<url>http://xyz56.com/janeDoe51/71.jpg</url>

<n>Jane Doe</n>

<p>310-555-1212</p>

<e>janeDoe51@somewhere.com</e>

<x>facebook.com/janeDoe51</x>

<x>linkedin.com/janeDoe51</x>

<k> diamond necklace</k>
```

Figure 2 u = http://xyz56.com/janeDoe51/71.jpg n = Jane Doe p = 310-555-1212 e = janeDoe51@somewhere.com x = facebook.com/janeDoe51 x = linkedin.com/janeDoe51 k = diamond necklace

Figure 3

2 Dimensional Barcodes
Data Matrix
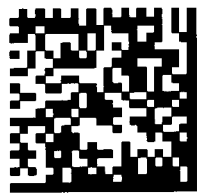
QR
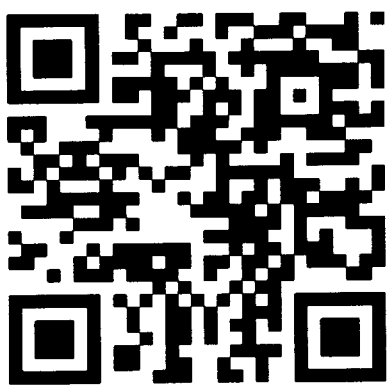
Figure 4

MOBILE PHOTO SHARING VIA BARCODE, SOUND OR COLLISION

REFERENCES CITED

"Bump suppression" by A. Huibers, U.S. Pat. No. 8,531,414 (2013). "Matching devices based on information communicated over an audio channel" by A. Huibers et al, US patent application 20130130714. "Bump button" by A. Huibers et al, US patent application 20130217335. "Bump validation" by A. Huibers, U.S. Pat. No. 8,577,292 (2013).

(Web References are from December 2014)
chirp.io
en.wikipedia.org/wiki/Exchangeable_image_file_format
en.wikipedia.org/wiki/Bluetooth
en.wikipedia.org/wiki/Social_networking
en.wikipedia.org/wiki/Geosocial_networking

TECHNICAL FIELD

The invention describes the use of mobile devices near each other, for sharing images (ie. photos).

BACKGROUND

As cellphones have become popular globally, it is now also common for a user to take and see photos on her phone. And to show these to others nearby.

This includes the cases where the photos were taken sometime in the past, or where the photos were taken recently. The latter might also include the case where a photo shows the user and those near her ("selfies"). And she then shows this group photo to them.

Photo galleries and photo sharing are extremely popular activities. Recently, for example, Business Week magazine said that Kodak Corp. identified some 700 competing photo gallery websites.

Photo sharing is often where a user uploads photos taken on her phone to some website, where she has a gallery of photos. This website could be part of or on a social network. Her friends can go to that website and see her photos. In some cases, her gallery is publicly accessible; not restricted to a set of users on the website that she defines as her "friends".

SUMMARY

Jane is talking in person to Bob, who might be a stranger. She shows him photos on her mobile device. He wants a copy of a photo. What is a simple way to do this, that minimises the number of manual steps either has to do?

Jane could work for a company that wants to promote its products. She has a mobile device with images of the products. She makes data that has a link to the image, where the image is put on the Internet. The data also has fields with her contact information, like her email address and phone number. The data is encoded into a barcode on her device screen.

Bob scans it with his mobile device. It decodes the data and gets her contact information and a link to the image. His device can reply with an auto-generated message to Jane. Her device detects this and records his electronic address. Her device can send a message to him, offering a discount or extra features about the product.

Instead of a barcode, other wireless means are possible. Including "chirp"—an identifier of the data is transmitted as audio from Jane's device. Bob's device decodes it, gets the identifier and gets the data from a server. Another method uses collisions—using accelerometers and geolocation on both devices.

The invention permits the automated transmission of photos and contact information between 2 people, with minimal manual steps.

Another use is for Bob to easily comment on Jane's photo, which is on a webpage. Bob writes or speaks his comment on his device. This is uploaded to the server, which adds the comment to the webpage.

A company can use the submission to build a database of potential customers interested in their products.

Another case is where the barcode and photo are on different devices. Jane wants Bob, who might be a professional photographer, to take a photo of herself and email it to her. She transmits her email address to him via a barcode, sound or collision.

BRIEF DESCRIPTION OF THE DRAWINGS

FIG. 2 shows an XML format of data encoded on Jane's device.

FIG. 3 shows a parameter-value format of data encoded on Jane's device.

FIG. 4 shows an example of a QR barcode and a Data Matrix barcode.

DETAILED DESCRIPTION OF THE PREFERRED EMBODIMENT

Figure 1:
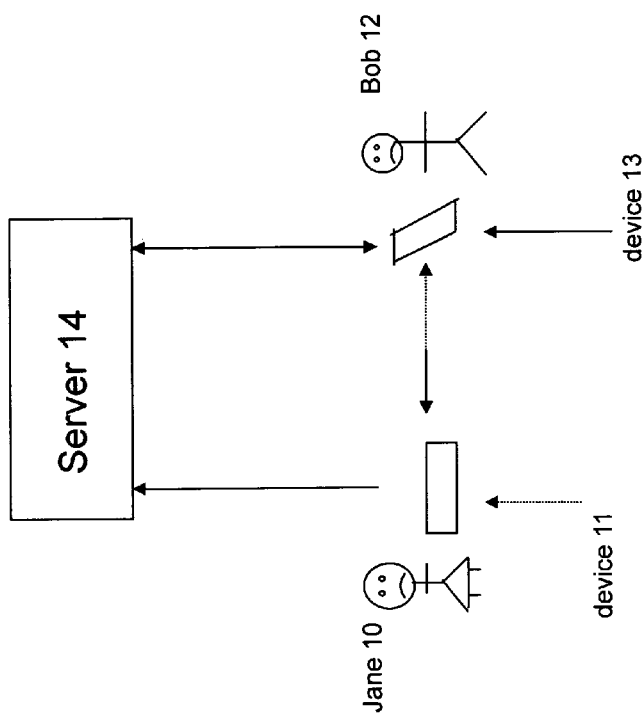
FIG. 1 shows Jane and Bob with mobile devices, in proximity.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, U.S. patent application Ser. No. 13/998,280 ["9"].

We Define Some Terminology.

This submission is about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

This submission is in general about the passing of images from one device to another. The most important type of image is a photo. Non-photo images could be those images generated entirely inside a computer. We shall refer below to photos, for simplicity. But in general, the broader term image is meant whenever photo is used.

The Background described the typical meaning of photo sharing or mobile photo sharing. The current submission wishes to extend the meaning.

The Submission has the Following Sections:
1: Base implementation;
2: Supervision;
3: EXIF;
4: Variations;
5: Chirp;
6: Collisions;
7: NFC, RFID, Bluetooth etc;
8: Ephemeral photos;
9: Commenting on a photo;
10: Anti-spoofing;
11: Personal social network;
12: Photo and barcode on different devices;
1: Base Implementation;

Consider FIG. 1. It shows a user Jane 10, with her mobile device 11. Near her is Bob 12, with his mobile device 13. Preferably, both mobile devices have Internet access. Jane's device has a screen, on which she can scroll through photos. She shows these to Bob. Suppose there is a photo that he likes. He asks if he can have a copy of it, or equivalently, a link to it. Alternatively, the suggestion comes from Jane—would he like a copy of it?

What is a simple way for Bob to get a copy? By simple, we mean as few manual steps as possible for both Jane and Bob.

In this section, we describe one solution, where the barcode [to be explained below in this section] and the photo are on the same device. While Section 12 describes where the barcode and photo are on https://sellercentral.amazon.com/gp/communication-manager/inbox.html/ref=sm_cmin_head_myodifferent devices.

But we dispose of the immediate suggestion that Bob simply takes a photo of Jane's screen; assuming that his device has a camera. There are several problems. First, his taking of a photo is lossy. In general, there is no intrinsic error correction in an arbitrary image. Second, Bob does not get any electronic address of Jane from his photo. Unless the image on her screen has this address written as part of the image. The disadvantage is that this can detract from the rest of the image. For example, suppose the image is of a tourist location, like the Grand Canyon. Depending on context, having her address appear in the image might degrade the aesthetics.

Third, more generally, suppose the image on Jane's screen shows some text. Bob's device might have Optical Character Recognition that can decode this into text. But the text might not have Jane's address. Or if it does, there might be other non-address data in the text, like a title or other descriptive information. Bob's software would need other heuristics (which can be unreliable) to isolate any address information.

Fourth, Jane's device might only be able to show part of the image at one time on its screen. The image might be higher resolution: more pixels in the horizontal and vertical directions than the corresponding numbers of pixels on Jane's screen. So if Jane were to decrease the viewing resolution so that the entire image fits her screen, then that is intrinsically lossy, even prior to Bob taking a photo of it.

In the prior art, the photo sharing that occurs often assumes that Jane and Bob are already acquainted. They might have each other's electronic addresses. So for example, Jane can send Bob an email, and attach the photo. Or she tells him verbally to go to her page on some social network, where he can see the photo. He has already visited her page in the past, so this is no problem for him.

But suppose Jane and Bob are strangers. They do not have each other's electronic addresses. In the prior art, he could verbally tell her his email address. She listens and types this into her device and then sends email to him, with the photo attached. Or the email body has a link (e.g. URL) to the photo on her website. Or, if the image is on Jane's photo gallery somewhere on the Internet, then she can verbally tell him its address. Which he then tries to type on his device or even writes down manually on paper.

Clumsy. The verbal recital can be misheard by the listener. And every letter in the recital is a key click to be done by the listener. Very error prone. Especially if his device is a cellphone with a virtual keyboard. The lack of physical feedback from virtual keys is well known to cause higher typing error rates.

Why would Jane show photos to a stranger? One possibility is that this is precisely her job. She works for a firm selling various products. The photos she carries show the products. Her duty is to promote these products by meeting strangers and showing them the photos, to raise awareness. As part of this, she would like to give them her business card, either as traditional hardcopy or in electronic form. Also, and especially, she would like their contact information, for those who express interest in a product. Many companies want to build such databases of contact information of customers and potential customers.

For decades in the prior art, an example is concert or event promotion. People are hired to hand out flyers for future concerts. This has always been haphazard and one way. Those doing so rarely collect contact information from people taking the flyers.

There is another drawback in this prior art. The person usually hands out flyers for only 1 or a few upcoming events. So she has many copies of the flyer for each event. But consider the more general case, where her firm has many products for sale. It is impractical for her to carry many copies of a flyer for each product.

Jane can have a program on her device that does the following steps. This program can be considered a mobile app. Or it can be provided by default as part of the device operating system. Or it can be a modification of an existing application. For example, suppose she is using the latter to scroll through a gallery of photos on her device screen. Then this application can be altered as described below.

The choices in the previous paragraph are considered functionally equivalent in this submission. For a given mobile device, where the hardware and the operating system are thus fixed, one choice might be technically better or easier to implement than the others.

Jane picks an option to makes formatted data about her photo that Bob wants. See FIG. 2 for an example. This shows the data in XML format, with example fields. The "url" tag has the URL of the photo. Here, it is assumed that the photo is already on some external website, xyz56.com, where Jane might have earlier uploaded the photo to. This website is Server 14 in FIG. 1.

The photo is 71.jpg in the example. Here, the "jpg" suffix denotes a JPEG format for storing an image. Other common image formats are possible, like GIF or PNG.

Also, instead of the URL pointing to an image, it could point to a web page that contains the image. So the suffix might be "htm" or "html".

Suppose Bob wants a copy of the image Jane showed him on her device. If he could somehow get the URL in FIG. 2, then this lets him see the image on a browser on his device. It is trivial for him to use his browser to save a copy of the image from the network to his device. Hence furnishing him the URL is equivalent to giving him a copy of the image.

Now suppose that the photo shown on Jane's device has not been uploaded to xyz56.com. Perhaps because the photo has just been taken. For the main use case is where Jane works for a firm, this is unlikely, as the images of the firm's products are likely to have already been made before she starts work. But the current case of the photo only being on her device is more likely when it is her personal photo.

In this case, the device might first upload it to Jane's existing gallery account on that domain. This presupposes that earlier, Jane set up the application with the necessary information about her username and password (and any other information), so that it can do this uploading automatically.

Or, suppose the domain does not hold her photo gallery. It might be a domain set up to temporarily hold data. Her device can upload to it. The domain server could store it with a name randomly generated. The resulting URL of the photo can be publicly accessible. Where privacy is gotten through the randomness of the name. For example, if a character in the name is restricted to lower case and upper case letters a-z and A-Z and the digits 0-9, this gives 62 possibilities. Then, for example, a name of 8 characters would be 628=2× 1014 choices. The advantage of this is that Bob's device, once it knows the URL, can access it without having to furnish a password to the server.

Or, suppose the domain server requires a password before sending the photo to an URL query. Jane's device already knows this. In FIG. 2, another field could be that password. Here, the physical proximity of Jane and Bob's devices reduces the risk of eavesdropping by others.

Related to this, the website xyz56.com might have an Application Programming Interface (API) to explicitly and easily enable such an automated uploading of images. Then the user (Jane) of the application can use the API in the above manner.

Another possibility is that the photo does not exist locally on her device. Instead, Jane might have been scrolling through her photos on that website. If this scrolling was done on her phone browser, there might be a modification installed to that browser, to enable the current functionality.

Figure 2B:
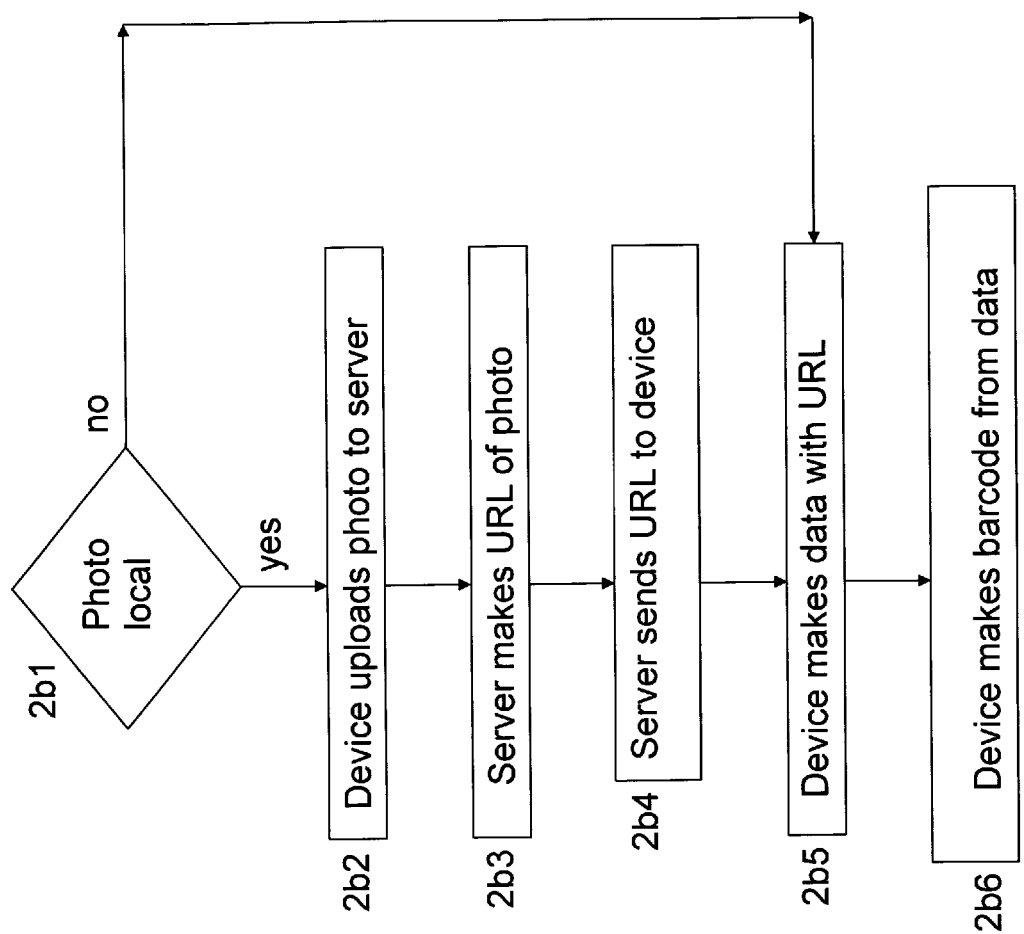
FIG. 2b shows the uploading of a photo from Jane's device.

FIG. 2*b* shows the main steps discussed above in a flow chart. The "device" referred to in FIG. 2*b* is Jane's device. Item 2*b*1 is a decision—Is the photo local (=on the device) or not? If yes, then we proceed to item 2*b*2. The device uploads the photo to the domain server.

Item 2*b*3 is where the server gets the photo and puts it in some location, and makes it accessible on the web. It makes an URL of the photo.

In item 2*b*4, the server sends the URL to Jane's device.

In item 2*b*5, Jane's device makes the data of FIG. 2 with this URL. Now earlier, in item 2*b*1, if the photo is already on the server, then it is assumed that Jane's device already knows the URL of the photo. So item 2*b*5 is gone to directly from item 2*b*1.

In item 2*b*6, Jane's device makes a barcode from the data. It displays the barcode on its screen.

We return to discussing FIG. 2.

The "n" tag is her name. The "p" tag is her phone number. The example shows the area code as well as the local phone number. The format of 3 digits for the area code and 7 for the local number is for the United States. There are obvious generalisations to other countries with other phone number formats. Another example might include the country code.

The "e" tag is her email address. There might be several "x" tags, for other electronic addresses for her. Like her LinkedIn™ or Facebook™ accounts.

In general, she should have at least one electronic address in FIG. 2, so that Bob can contact her.

The "k" tag could be one or more keywords, that describes the object in the image. There could be several keyword tags. These let Bob's device, once it has gotten the data, run a program against them to help it classify the data. For example, it gives the program more information about Bob's interests. So the program can learn from his activities without him having to explicitly train it. His program can also use image recognition methods against the image. But having the keywords can be a great simplification computationally.

Another tag (not shown in FIG. 2) could be a location. Perhaps the current location Jane and Bob are at. Or the location of a nearby store that holds the item in the image. Or the location of the item. The latter might be if the item is a house for sale. Or if the item is an event like a concert or rally. For a rally, imagine if Jane is promoting a political rally, for example.

In the location tag, the location could be written in several ways. One might be as human readable format—e.g. "156 Main St, Eagle Rock Calif. 91106". Or as numbers for latitude and longitude ("lat-long"). Other formats are possible. While the lat-long is preferable for another machine to directly use, mapping algorithms and databases are now advanced enough that the former format might suffice for the machine to also find the location.

Related to this, another tag (not shown in FIG. 2) could be a time or range of times. When the store is open, or when the concert happens. By time, we mean both the date and the time of day.

A generalisation of the location is a trajectory. A path as a function of time. This could be of a travelling event, like a circus or a band doing a tour at different venues.

Another tag could be an identifier of the item, if appropriate. Suppose the item is being sold by a store. The identifier might be a Universal Product Code (UPC) or a Stock Keeping Unit (SKU) or, for a book, an ISBN.

Given that an URL is one of the preferred tags, another URL could be used, pointing to another web page with the data that would otherwise be written in several tags. This can reduce the total size of the data in FIG. 2. This second URL, or URI (Universal Resource Indicator), might be to a Web Service, where the data can be asked for in a programmatic manner, rather than provided as a single text block in a web page.

Another tag might wrap arbitrary text. This lets Jane or someone else at her company write, at some earlier time, remarks about the item in the image. Or she might just have done this. But we expect that in general, it is easier for this text to have been written earlier.

Other formats are possible. FIG. 3 gives an example in a parameter-value format, each pair to a line.

None of the contact information fields in the figures is mandatory. Though by the basic assumptions of this submission, Jane is expected to want people to know her contact information.

Note in FIGS. 2 and 3 that her application can make either with no manual input from her. Other than, of course, the manual actions she takes to scroll through her photos and to start her application. The application knows which figure is being shown in the screen, and the contact information was entered by her at some earlier time and is typically constant over an extended period of time.

FIG. 2 could have an extra field which is a link to a photo of Jane. This can be useful if the main image in FIG. 2 is not a photo of Jane but of a product her firm sells. Having a photo of her (or equivalently a link to a photo) in FIG. 2 helps people she talks to remember her.

FIG. 2 could also have an extra field which is a link to audio by Jane (or someone else in her firm). The audio might describe the item in the URL tag. If the audio has Jane's voice, then this can aid Bob remember their conversation.

The remarks made in the last 2 paragraphs also pertain to FIG. 3.

In FIG. 2, we return again to the url tag. We said the website was assumed to be an external website. Another possibility is that her device has a "permanent" Internet address. Currently, this is rare. But the anticipated expansion of the Internet of Things (IoT) and the concomitant use of Internet Protocol version 6 (IPv6) is expected to make this case more common. In this case, the hypothetical domain xyz56.com might be that of her device. Her device runs a web server to answer http and other Internet queries.

In FIG. 1, this corresponds to Server 14 being part of Jane's device 11.

A third possibility is that the image shown on her screen is directly encoded in the data of FIG. 2 or FIG. 3. We shall return to this below.

The application then takes the data and makes a barcode. There are various one, two and three dimensional barcode formats. FIG. 4 shows examples of 2 popular two dimensional barcodes, QR and Data Matrix. A possible implementation of this submission might pick one of these formats.

An alternative is where the data in FIG. 2 is itself made into a web page with its corresponding URL. The latter URL is then encoded into the barcode. We treat this as a minor variation, equivalent to what has already been described for the scenario of FIG. 2.

The barcode is shown on Jane's device screen. Bob uses his mobile device, which is assumed to have a camera, to run an application. This takes a photo of the barcode and decodes the image into the data in FIG. 2 or 3. It is assumed that the meanings of the tags in those figures has been promulgated at some earlier time. So the applications on the devices "know" the meanings of the tags.

The taking of the photo involves the manual steps where Bob starts the application, then moves his phone so that its camera focuses onto the barcode on Jane's screen. He presses a button to take the photo. Or his device might be smart enough so that it auto-detects the barcode and takes the photo. The latter needs some amount of image recognition in the device, but it spares Bob an explicit step.

Currently in the prior art, there are free apps for the major cellphone operating systems of Android™ and iPhone™ that decode data in a QR code. Some apps also, after decoding, analyse the decoded data. If the data is in the form of an URL (e.g. it is ASCII and starts with "http://" or "https://"), then the app brings up a phone browser and loads it with the URL. Or if the phone browser is already running, the app either makes a new browser page or tab and loads it with the URL, or it updates the current browser page with the URL.

The applications of the present submission differ from those of the previous paragraph. But it can be appreciated that programming the new functionality can use some steps and procedures already in the prior art.

The difference is that now, the decoded data of FIG. 2 is not just an URL. Bob's application can now do one or more of several things. It can extract the URL and bring up a browser and load the image. This is desirable so that Bob can see quickly that he successfully got access to Jane's image on his device.

His application can store the data in some location on his device, so that it can be used at some later date. Equivalently, it can store the data on a location on the Internet, to which it has write access.

His application can also check that it recognises at least one of the fields as contact information for Jane. Like her email address. From Jane's and Bob's standpoints this is important. The equivalent of her handing him her business card.

Bob's application can also send an auto-generated message to one or more of Jane's electronic addresses. Preferably to her email address. The body of the message might also include the URL of the image that she sent him. When she gets this email, she now has his email address. This is also important to her. So that she can add this to her database of contacts.

The inclusion of the URL of the image in the email is useful. It tells her which image Bob was interested in. If Bob is a stranger, and she meets many such strangers over several hours, then it can be hard and error prone for her to manually remember (or write down) what each person was interested in.

Bob's message can also include a photo of him. This can help jog Jane's memory of her conversation with him. Useful if she meets many new people and has to manually review her emails hours or days later. The photo might be physically inside the message, as an attachment. Or the message could have a link to his photo on the network.

A manual equivalent in the prior art is as follows. Bob gives her his business card. On it, she writes down which image (i.e. product) he was interested in. But in a practical situation, the average person does not carry around business cards for himself. So even this prior art scenario, while clumsy and error prone, is not actually possible in many cases. Whereas nowadays, the average person is more likely to have a mobile device (like a cellphone).

Another remark is that in the prior art, there is an asymmetry in the possession of business cards. Jane is likely to have cards if she is employed to promote products to the public. But if her audience is the general public, then, as above, they often won't have cards. So any transfer of cards (and hence contact information) is one way, from her to them. Our submission enables a simple two way transfer of contact information.

In FIG. 2 and above, when we described Jane inserting a link to an image of her, and Bob doing likewise in his automated reply, note that this is more important when they are strangers.

Jane's application can be set up with links to her email account, if her email provider has an API that permits this. For her application to detect when she gets the above email from Bob. Remember that she typically does not know Bob's email address, or even his name. So the inclusion in his email of the URL that she sent him can be searched for, to identify programmatically his message. And thus to extract his email address.

If her device detects Bob's message, it could also have the ability to move or copy that message into a folder/directory on the mail server that is meant for such messages. So that when Jane later manually looks at her email, she does not have to contend with seeing this message in her inbox.

If Jane's message in FIG. 2 had her phone number, similar remarks can be made. Her application can try to detect incoming SMS or MMS messages, to see if any are from Bob. If so, then Bob's phone number can be recorded into her contact database.

Suppose Jane's device detects a reply from Bob. It can supply tangible feedback to her device, depending on its properties. The device could emit a sound (beep) in some distinctive pattern. It could pop up a window on its screen with, e.g. Bob's name extracted from his message. The device could vibrate. It could do one or more of these actions (or other actions). Here, tangible means actions detectable by Jane's natural senses.

The point is to give feedback to Jane that a contact loop has been successfully made. She has sent Bob her contact information and she has gotten his. This feedback incents her and motivates her to find others.

Suppose her device detects Bob's message. The following optional steps can be done. Her device sends an auto-generated message to Bob's electronic address. This message might have a voucher. So if the original image which he wanted is of a product her firm sells, then the voucher could be a discount or a password. This incents Bob to have his app send its auto-generated message to her, so that she can get his electronic address.

The voucher could be in a form of an ASCII string that he can input (e.g. by copy and paste) on some web page. And the message could have a link to that page. Or the voucher could simply be a link to another web page, where Bob can make a purchase.

Another example field in FIG. 2 can be a final time. If Bob replies before this time, he might be eligible for a lower price on the item shown in the image. A similar case could be where if he responds in time, the current offer stands. But if he responds after that time, the current offer is expired. Or the image URL will be accessible only before or only after that time.

The concept of specifying a time in the data, and what that time means can be made quite intricate. We described a final time. But there could be an initial time, where the image is only available after that time. There could be both times, giving a time window in which to see or copy the image.

Another use of a time field could be that if Bob wants to see the image before that time, he can do so. After that time, he must first send an email to Jane. This email might be auto-generated by his device. When Jane gets the email, her device might then turn on the access to the image. Or perhaps before that time, he can see a high resolution image. After that time, a low resolution image. Unless he sends an email to Jane.

FIG. 2 could have a location field. Bob can only see the image when he is within some radius of that location. Or, the field might be a geofence. Bob can only see the image within that defined area. Outside that radius or area, he might not be able to see the image, or see only a low resolution image.

The concepts of defining the access time/s and location can be combined. For example, Bob can see the image only during the given time interval and inside a given geofence. Outside this time interval or area, the image might be inaccessible or only be low resolution.

Above, when we referred to Bob being inside a given area or geofence, of course, the requirement could be that he is outside.

Bob's device can extract those time and location data. Then, assuming that it has a clock and it knows its location, it can tell Bob whether currently it (and him) satisfies the conditions to view the image. If he does not satisfy the conditions, the device might detect this, and tell him when a constraint is being approached or has been broken, either in time or space. For example, if the device is reaching a geofence, it can alert Bob, saying that the image will no longer be accessible if he keeps going in his current path. Or, if he has gone outside the geofence, it can alert him, and furnish a path to re-enter the desired area.

For the temporal case, the difference is that once a time limit has been reached, he cannot go back in time. So here, the key alert is before the limit.

If the photo or image is of a future event, then the data in FIG. 2 might include the time and place, as discussed above. Bob's device can check against his calendar. Not just for a simplistic overlap in time with another commitment of his. Suppose there is no overlap. His device can try to plan a journey from his expected location before the event, to the event. This expected location can be derived from the device's knowledge of its location in previous days or days of the week, and knowledge of his habits.

Above, in discussing FIG. 2 or 3, the image was supposed to be not inside the data packets of those images. Another case is where the actual image is encoded in the packet. This is unlikely, given the finite and limited capacity of a barcode to hold data.

Suppose Jane has several photos in a photo gallery. One way to sort these is by those which have been picked the most via the mechanism of this submission. So that Bob might see first those photos which have been most popularly picked via the barcode.

If Jane's firm has several people hired like Jane, and they are separately showing the same set of photos (which might be of the firm's products), then the count of which photos are picked via the barcode can be done across all the Janes.

2: Supervision;

Above, we discussed Jane having her email address in FIG. 2. If she is working for a firm, this address could be, or perhaps should be, at the firm's mail server. The firm can have a program running on that server (or a modification of the mail server program) that scans mail going to her account. In general, the firm can do this, since it is on their machine and she is their employee.

The program can keep track of her progress. It is a management or supervisory program. By counting up the number of replies she gets from people she meets, it lets her supervisor gauge her level of activity. This is the analog of a GPS system outfitted to a truck, so that the trucking company can check that the truck driver maintains an appropriate route and schedule.

It is an advantage of this submission that the above is possible.

This is no trivial concern. In the prior art, where a person is hired to hand out flyers to people, an enduring problem has been where she simply drops some or many of these in the bin. As a practical matter, she works under no direct observation by a boss. Since he likely has several such people reporting to him. He often has to take her word that she handed out those flyers diligently.

If the firm has a program doing the above, it could interact with a program running on Jane's device. The firm's program on its mail server could be the one that automatically sends out a reply to Bob's message, where the sender's address on this reply might be Jane's address at the firm, or possibly another address.

Earlier, we described actions that a program on Jane's device could do. Now, some of those actions could be done by the mail server, or by a combination of the mail server and her device.

3: EXIF;

This refers to the Exchangeable Image Format. It is used for embedding metadata in an image file. Typically, the data might be the date and location where the image was taken. Referring to FIG. 2, an extension is where EXIF is modified to let one or more of the fields in that figure be stored as metadata inside the image file.

4: Variations;

In FIG. 2, the data sent by Jane might also include an id of the image that Bob is interested in. This id can be much shorter than the URL of the image. When or if Bob's application returns an auto-generated message to Jane, instead of putting the URL in the image, it inserts the id. This might be in part to make that message shorter. Suppose it was an SMS string, subject to a 140 character limit, for example. On Jane's device, when it gets such a message, it can map back from the extracted id to the original image.

Bob's auto-generated message might also have a link to Bob's web page, if he has one. So that Jane can visit this, to find out more about him. This can be valuable to Jane in helping her decide what other products of her company he might be interested in.

Another reason for the URL in FIG. 2 pointing to a web page containing the image, instead of just to the image, might be to facilitate purchase. The widgets, buttons and links in the page would let Bob buy the product depicted, electronically.

A special case of the previous paragraph is where the product might be the image itself, or a high resolution version (aka. full image). The page could have a low resolution image. Then perhaps by making a micro-payment, Bob can buy the full image.

Above, we referred to Bob's auto-generated message. Bob's device might have an option that lets him override whatever would be auto-generated, to manually customise a reply to Jane.

Initially, we described how Jane's device shows an image that Bob wants. It could be that her device shows several images that he is interested in. Perhaps one at a time on her screen. Or perhaps as thumbnails (small images). It is obvious that there are several means at the GUI level where Jane can pick those images, based on some type of input from Bob. Her app can make a temporary folder on her website, with links to those images. Then FIG. 2 (or 3) would have its URL be a link to that folder of picked images. There could be different ways that achieve this ends.

Thus far, we referred to photos or images. An immediate extension is to video.

The URL in FIG. 2 or 3 could refer to a video file, stored in some standard video format, on the network. And earlier, when we described Jane as showing photos to people, now, she might show videos to interest people nearby into getting their copies.

Another variant is audio. Where instead of Jane showing Bob an image, she plays audio for him. And he wants a given audio clip. The URL in FIG. 2 or 3 could refer to this audio clip at some network location.

5: Chirp;

Earlier, we described the use of a barcode to encode the data in FIG. 2 or 3. The barcode is a means of transmitting data across the air gap between the wireless devices of Jane and Bob.

Another means of communicating between the devices in FIG. 1 is by sound, instead of using a barcode. This assumes that Jane's device can emit sound and Bob's device can record sound. One key case is when both devices are cellphones.

This differs from our remark in the previous section about Jane playing audio clips to Bob. There, the audio comes from Jane's device. We suppose that Bob wants a given audio clip. But without the errors inherent in him using his device to directly record that audio. Another scenario is that the audio might be only a small subset of a longer audio. Just like when Jane shows images, and shows only a reduced low resolution image (e.g. thumbnail) of a larger image. So for the audio case, Bob might want the full audio, and preferably an exact copy of it.

Recently, researchers Bergel and Steed at University College London released a product "Chirp" (cf. Chirp.io) that encodes data, like an URL, via what they term a shortcode as a short sound resembling birdsong in an audio range audible to humans. Cf. their US Patent Application 20120084131, "Data Communication System" [Bergel].

A device, like a cellphone or personal computer, encodes and emits this Chirp. Another device nearby might be able to detect this and, with the appropriate decoding or demodulating hardware and software, converts it to an URL, assuming that the decoded data is of this form to begin with. The detecting device would typically be a cellphone, inasmuch as it could intrinsically record audio. Then the software would launch a browser with that URL, if the device had Internet access, via either a phone carrier or a nearby WiFi or WiMax hot spot or some other wireless means.

The fundamental insight of Bergel used the longstanding idea of representing an arbitrary length bit sequence by a usually much shorter hash. Bergel also used the observation that the simplistic encoding of the former sequence as sound resulted in a lengthy sound, which was harder to transmit and receive. Instead, if the hash was encoded as sound, then the transmission of this was equivalent to transmitting the original signal, provided that the receiver could take the decoded hash and somehow map it back to the latter. The much shorter length of the hash resulted in a sound (aka. Chirp) that was in turn much shorter in temporal duration, and thus quicker to transmit and receive.

See Also our Submission "7".

Figure 5:
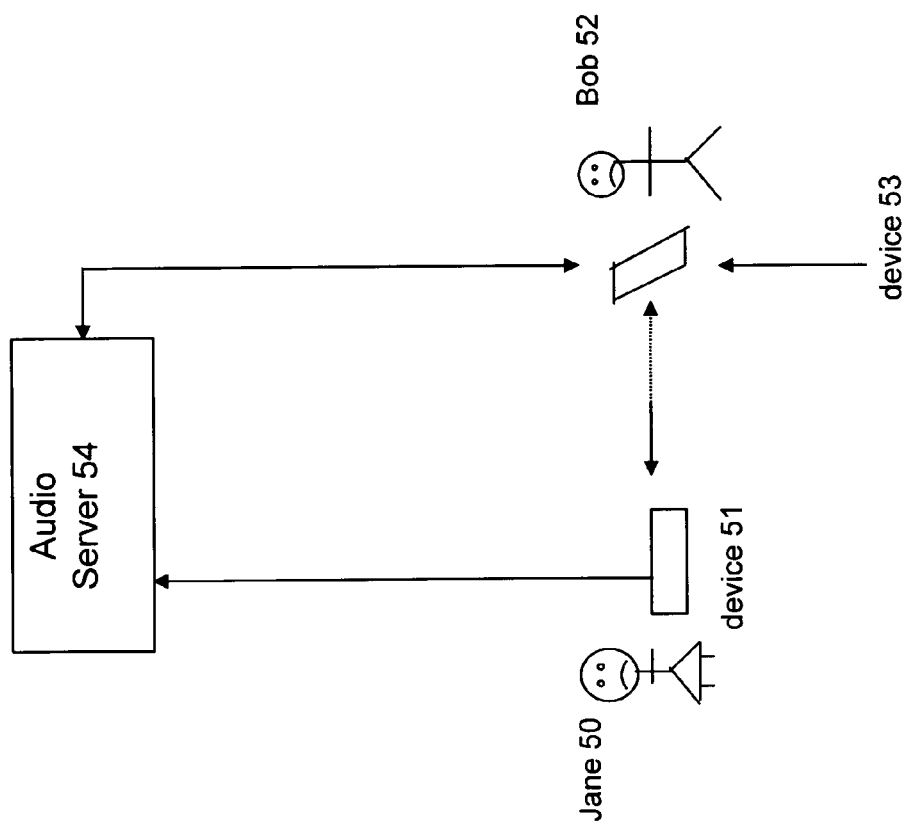
FIG. 5 shows Jane and Bob using audio to transmit data.

FIG. 5 shows Jane 50 with mobile device 51, and Bob 52 with mobile device 53. Jane starts an app on device 51 that makes the information in FIG. 2. It uploads this to Audio Server 54 which is on an electronic network, assumed to be the Internet. Audio Server 54 stores that data and associates it with an id, which might be taken to be a hash of the data. The id is returned to Jane's device 51. The latter converts it to audio form. This is played.

Bob's device 53 records this and decodes to get the hash. Device 53 uploads the hash to Audio Server 54, which replies with the original data of FIG. 2. Once device 53 has that data, the current submission then proceeds as in the earlier sections, after the barcode was decoded by Bob's device.

Qualitatively, a difference between this section and earlier sections is that the use of audio necessitates the existence of an external server (the Audio Server). Whereas when a barcode was used, the data could be encoded and decoded entirely on the mobile devices.

6: Collisions;

Another means of communicating between the devices in FIG. 1 is by collisions, instead of using a barcode. This assumes that Jane's and Bob's devices have accelerometers. This also assumes that both devices know their locations, e.g. by Global Positioning System (GPS) methods. One key case is when both devices are cellphones.

This uses inventions by Bump Corp. (Now bought by Google Corp.) See our submission "9" and the patents and pendings by Google for more details on the prior art.

Figure 6:
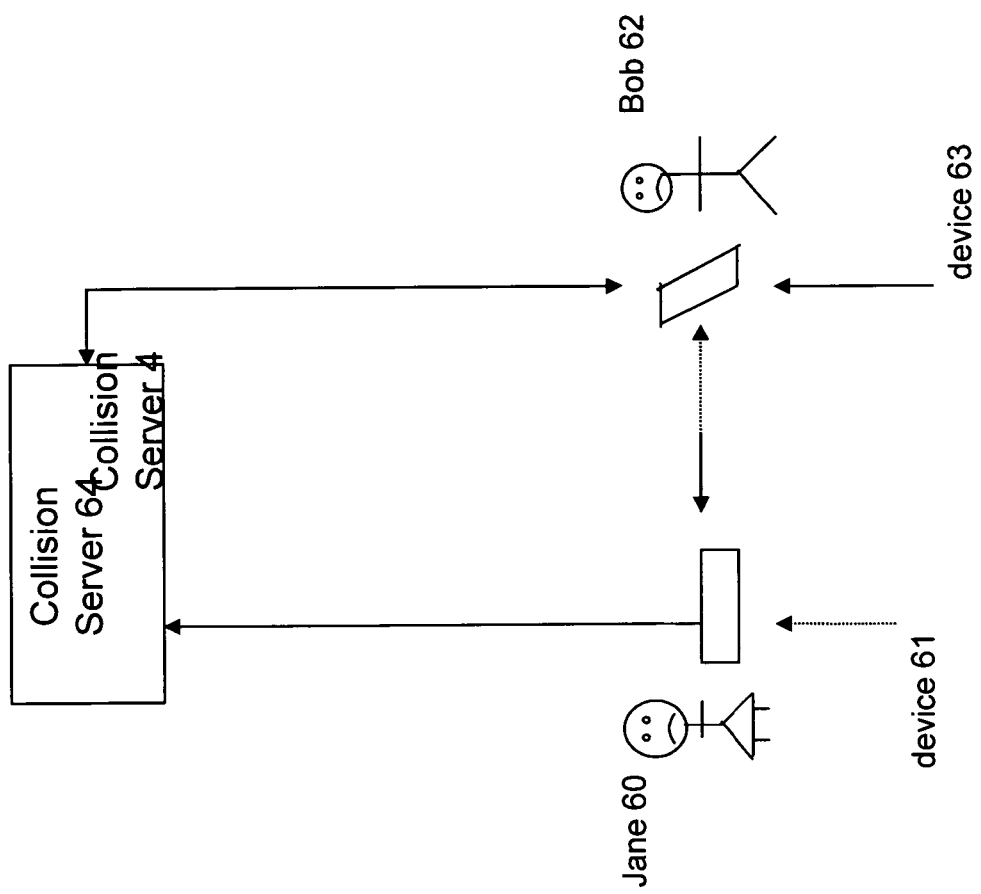
FIG. 6 shows Jane and Bob using a collision to transmit data.

See FIG. 6. It shows Jane 60 with mobile device 61, and Bob 62 with mobile device 63. Jane starts an app on device 61 that makes the information in FIG. 2. It uploads this and its location to Collision Server 64 which is on an electronic network, assumed to be the Internet. Collision Server 64 stores that data. Bob's device 63 uploads its location to Collision Server 64.

The location data uses external devices (i.e. satellites). For simplicity, these are not explicitly indicated in FIG. 6.

The users collide their devices, each of which uploads its accelerometer data. Collision Server 64 then uses the location and accelerometer information to infer that the data uploaded by Jane's device 61 is meant to go to Bob's device 63. The server downloads the data to device 63.

Once device 63 has that data, the submission then proceeds as in Sections 1 and 2, after the barcode was decoded by Bob's device.

Qualitatively, a difference between this section and Sections 1 and 2 is that the use of collisions necessitates the existence of an external server (the Collision Server). Whereas when a barcode was used, the data could be encoded and decoded entirely on the mobile devices.

7: NFC, RFID, Bluetooth Etc;

Thus far, this submission has described the use of 3 ways for information to cross the air gap between the mobile devices of FIG. 1. One uses a barcode. A second way plays audio. A third way collides the devices and uses accelerometer and location data. In general, other wireless methods might exist.

One possibility is Near Field Communication (NFC) or Radio Frequency Identification (RFID). NFC has a range of around 10 cm. While RFID has a range of several meters. But in the context of this submission, we consider these to be equivalent.

Suppose device 11 in FIG. 1 can transmit an NFC signal. And Bob's device 13 can receive such a signal. One case is that the signal can encode the data of FIG. 2 or 3. Then device 13 is assumed to be able to decode the signal without using an external server. In this case, we have essentially the barcode scenario of Section 1. The other steps in that section then can be used here.

But suppose the signal cannot directly encode the data of FIG. 2 or 3. Or it is not desired to do this. This distinction can be seen in Section 5. If the audio directly encoded the signal, the audio would have been too long to be practical.

Then the mechanism of Section 5 and FIG. 5 can be used, with minor changes. The data is uploaded by device 11 to a server on the network. The server returns to device 11 an id (like a hash) of the uploaded data. This id is transmitted by device 11 in the signal to device 13. Which then extracts the id and presents it wirelessly to the server. The server sends to device 13 a copy of the data uploaded to it from device 11.

Another transmission mechanism might be Bluetooth. Assuming that both mobile devices have compatible Bluetooth ability, then the above could be done. Either omitting an external server, or using it as an intermediate depot for data going from Jane's device to Bob's device.

8: Ephemeral Photos;

Ephemeral messages and photos have been popular lately, as seen by the use of Snapchat Corp. and Yovo Corp., as well as other companies' products. This submission has similar functionality. If Jane's application uploads her photo and any associated data to a server, she can set start and end times for when it is accessible on the network.

This can be extended. Jane can define how many times the photo (and any associated data) can be accessed. A strict case is single access from the network. After which, the photo is removed.

In turn, another extension is that the number of accesses might exclude counting accesses from a few network addresses. Those addresses can be her network addresses. Either of her mobile device or some other devices, perhaps at her firm. This can handle the case where she (or someone else at her firm) might want to view the photos herself later, after they have been uploaded. Perhaps to double check, to let her improve the photos by uploading altered ones or new ones.

Earlier, we described how the server holding the photos might make a random name for it. If Jane later wants to alter the photo by uploading a changed photo, the server would have an option to let her use the current random name as the name of the altered photo. This is to handle the case where the random name has already been sent to Bob and others, and where they might have not yet seen the photo.

An alternative is just to use a symbolic link on the server file system, to point from the current random name to the newer file.

9: Commenting on a Photo;

We started this submission by asking a basic question— How to easily copy a photo from one mobile device to another? The current section asks another basic question. Jane shows Bob a photo on her device, as in FIG. 1. He wants to electronically comment on it. What is a simple way to do this? Again, without assuming that they already know each other.

In the prior art, an analog might be a website that sells books, like amazon.com. The website lets visitors write reviews of a book, and to like or dislike an existing review, and to write a comment on an existing review. An older analog dates back to the electronic bulletin boards of the 1980s, where someone could post a message, and others could write replies to it, in a news thread. The current use of blog websites is essentially a version of the bulletin board.

But all of the prior art has one thing in common. The person seeing the article or image does so on his computer. Usually a desktop, but nowadays it could be any type of computer, including a laptop or a cellphone.

The present scenario has one crucial difference. Bob sees the image on Jane's device. Let us assume that the image has an URL. For him to comment, he needs that URL on his machine. We deliberately leave outside the scope of this submission any mechanism where he makes his comments on Jane's device. For example, where she lets him type the comments on her device. Or where he speaks into the microphone of her device.

The mechanism in this submission is that Jane's device encodes an URL of a webpage. That page can optionally include the image that Bob saw and wants to comment on. It has input fields where he can write his comment. Or the page can let him speak his comment into the microphone of his device. The URL is converted to a barcode on her device. Bob scans it with his device, which decodes it and brings up that webpage on his browser.

Bob writes or speaks his comment. There might be a field in the webpage for him to rate the image, perhaps from 1 to 5, in order of increasing approval. Five means top approval. One means he dislikes it. The page has a button to let him submit his opinion.

When he presses this, the page is sent to the web server. Which might then apply various filters or rules to it. If the comment passes, it, or a summary of it, can be added to the page with the image, that is pointed to by the original URL. (Assuming that the image is on a web page.)

That page can update any relevant statistics on it. For example, the page might have said "5 comments (3 likes)" before Bob did his review. After he submitted it, the page might say "6 comments (4 likes)", assuming that his rating for the page was defined as favourable. The latter might be a rating of 4 or 5 out of 5, for example.

Above, we offered the option of Bob being able to make a vocal review, instead of typing. This takes into account the fact that he is reviewing on his mobile device, on which typing is hard. It may be much easier for him simply to speak it aloud. This can depend on the individual. Some people can type fluently and accurately on a cellphone. Others cannot. Having the speaking option can be a significant utility for the latter.

The server can run an Automatic Speech Recognizer (ASR) against a spoken review, to try to convert it to text. Then, on the original webpage with the image and comments (NOT the webpage that Bob spoke his comments into), the text can be shown by default. In part, because people can read text faster than listening to a recording.

As part of the page, it can indicate whether a given comment was originally spoken or not. If spoken, there could be a button next to it, to let the visitor hear the original recording.

A related example of this in the prior art is by Google Corp.'s Google Voice™. This is a phone number offered to people. The number acts as a recorder. Someone who calls it can leave a message. A Voice server then runs an ASR against it to make text. The person who has the phone number also has a Gmail™ account. She logs in. The text output is shown as an email, with notation indicating that it came from a phone call. The webpage has an option to let her hear the original call.

The current section offers the advantage that Jane can solicit reviews from nearby people. Given in the immediacy of the moment. At the point of maximum persuasion by her, or, equivalently, at the point of maximum mindshare.

The webpage showing the image and comments might also distinguish between reviews made by people in the immediate vicinity of Jane, and those made by others who came to that webpage by other means.

Above, in this section, we described the use of a barcode to transfer the URL. As in earlier sections, other mechanisms like a chirp, or collisions can be used.

This enables a feedback loop in a social network context, where other visitors can see how popular the images are. This is useful in a corporate context. Jane's company wants as many visitors and commentators as possible to its web pages.

It is well known that this is desirable for many types of products. But hitherto, comments have been dominated by those made by typing, even as many users have migrated to heavy use of their cellphones for computational interactions.

By enabling voice comments, the company or person who owns photos (perhaps of products) might more easily collect comments.

There is a tradeoff. Going from voice to text via an ASR is not fullproof. But just like written comments ('tweets') made on Twitter Corp are (currently) subject to a 140 character limit, those have proved popular. That limitation notwithstanding.

10: Anti-Spoofing;

For a website that lets visitors comment and vote on articles or products, there can be incentive for fraud. An adversary might recruit humans to vote or comment on an item. Or use robot ('bot') programs. Or a combination of humans and bots. There are many techniques the website can use to try to defend against this. But the fundamental problem is hard. A visitor can visit the website from any address on the Internet. And, in all the scenarios, the visitor somehow already has an URL for a page on the website.

In contrast, this submission lets the website defend in simple ways. The basic idea can be seen in FIGS. 1 and 7. Whenever Jane has her device make a barcode, or emit a chirp or bump her device against Bob's device, her device makes a random token, x. This is put into the URL. Optionally, the URL can also have an identifier of Jane. This is useful if the firm employs several Janes, sending them out to show the products to the public.

Figure 7:
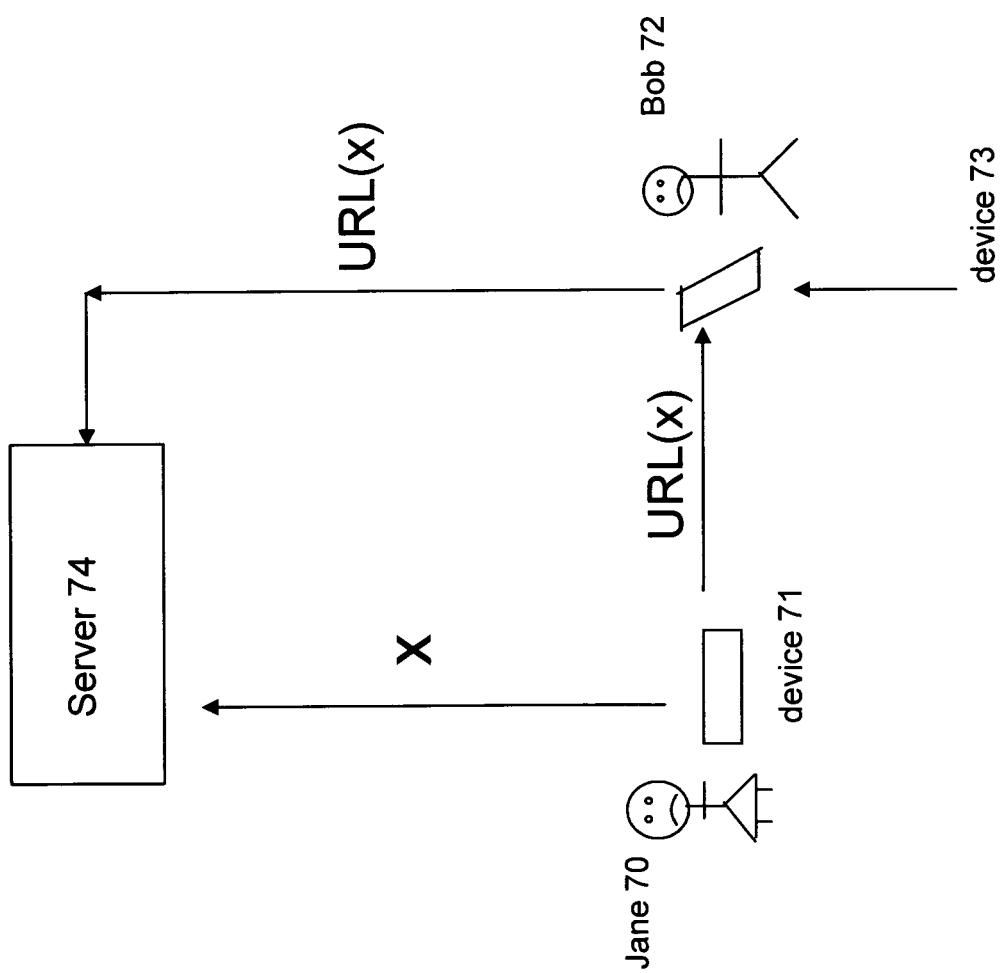
FIG. 7 shows Jane's device making a token in an URL sent to Bob.

See FIG. 7. There is Jane 70 with her device 71. When Jane tells her device to make a barcode that encodes an URL, device 71 makes x and sends x to the firm's server 74. Her device makes the URL and communicates it to Bob device 73. In the arrow going from device 71 to device 73, we attached a label URL(x). This indicates that the URL has x embedded. Bob's device 73 decodes the transmission and gets the URL. Device 72 makes a request by sending the URL to server 74.

When server 74 gets the URL, it extracts x and Jane's id. The latter is optional, and is only done if the id is put into the URL in the first place. If this x and id matches an (x, id) recently gotten from Jane's device, then the server considers this a valid URL request and returns a web page. Bob's device 73 then shows it and Bob can fill it out and upload it to server 73.

But if the extracted x and id do not match the server's record, then the server sends an invalid reply to Bob's device 73.

The server might have a policy that the (x, id) it gets from Jane's device has a maximum lifetime. After which, it expires.

Embedding the (x, id) into an URL by Jane's device 71 is trivial. For example, the string "j=iUA0&k=15". The j label refers to the random token ("iUA0" in this case), and the k label refers to Jane's id (15 in this case). Of course, the x and id can be combined into one string, with one corresponding label, as an alternative formulation.

Above, we described putting Jane's id into the URL. A variant is where this is unnecessary. Jane's device might have a stable network address for, say, the amount of time that she is working. If her device inherently has a fixed network address, then this is obviously true. But suppose otherwise. She might go to some area where she will be working. She connects wirelessly to the network and is assigned a network address. While this is temporary, it might last for her entire day.

If so, then when she first gets that address, her device can connect to her firm's server. It records her address, and this is her id. Then, when she later makes an URL to be sent to Bob, she makes a token and uploads this to the server. The server gets this from her known network address. So later, when the server gets an URL from a hitherto unknown device, and finds the token, it can associate it with Jane.

This uses a stateful URL. While earlier when the URL had her id, that was a stateless URL.

Suppose Bob's device 73 has gotten a web page from the server, for him to fill out. What is to stop him from sending a copy of this web page to others (human or bot) to also fill out?

One method is to record the Internet address that Bob's device 73 has, and then allow only one submission from that address. However, consider a non-adversary Bob, where if Bob were to transfer the page to another of his devices, and then fill out and submit the page from the latter, this would fail. This might be seen as undesirable by the firm, as it could turn off a potential customer.

Another method is to note that the page must have a reply URL, which is activated when Bob presses a button like 'submit', to upload whatever he had written or spoken, to the server. When the server above made the web page that it sent to Bob's device 73, the server can put a random token into the reply URL. In general, this token would be different from that made in FIG. 7 by Jane's device.

The server records this token. Then it might allow only one submission, which can be from any network address, for this token.

Above, we described a token x as being made randomly on Jane's device 71. A variant is where x is made on server 74. This could be done when device 71 makes a request to server 74 for a token. Or the server might a priori make a set of tokens and send them to device 71 at the start of Jane's day. The reader should appreciate that these are all minor variants.

Another variant is where the token is not random, where it might be made on Jane's device or on the server. There is a possibility of an attack vector in this case. Suppose the token is generated sequentially, starting at a value of 0. When Jane wants an URL made, the value might be incremented and then put into the URL. A malicious Bob who discovers that the token is incremented can copy the URL he gets. He makes new URLs, incrementing the token.

With the original URL, he can submit ('vote') only once. But with the new URLs, if he submits these (perhaps from machines with different network addresses), and these arrive at the server ahead of requests from other people that Jane has met, then Bob's new submissions can shut out requests from them. He can vote several times, instead of them.

This is the problem with a predictable algorithm for generating tokens. A firm implementing this submission should decide if this is an acceptable risk.

11: Personal Social Network;

Thus far, we discussed the main use case where Jane is working for a company that wants her to meet strangers to tell them about its products. A second use case is where Jane on her own behalf wants to meet people. This could be for friendship or romantic reasons. It is well known by now that there are many websites, with affiliated mobile apps, for this, that use the user's location. Including Tinder, Grindr, Gowalla, Clixtr and Yelp.

These stem from the fundamental observation that a person's friends are all originally strangers to her. By some social mechanisms, they become her friends.

The above websites (and others) often have a common overall mechanism. A user joins the website and downloads a mobile app to her mobile device. This app uses the location of her device as input and enabler of various activities. Like her posting remarks, which are then uploaded to the website. These remarks can be tagged with her location. So others can search for remarks made in a given region, and contact her, if they wish. Another idea is she uses her location via the app to find others nearby, who are also using the app and who are broadcasting their location via it.

Most if not all of these assume that the users have already joined the website. Another common assumption is that when searching for others, they are not necessarily nearby. They could be out of line of sight.

The functionality in our submission for the users' devices is more general than personal networking. Users who have this, either as the person originating the photos or the recipient, can use it for professional or personal networking.

Our submission is directed towards a nearby in person interaction. It could also be incorporated into other social networking sites and apps. To allow continued interactivity by enabling easy transfer of contact information between people, and where both people are not assumed to already be members of the social network. It minimises the time taken to transfer information, by reducing the number of manual steps. It lets the social network recruit.

But our submission can also be used where the people in a nearby interaction are both members of the same social network. This can apply when that network has many members. Two members might meet as strangers, by coincidence perhaps. Call them Jane and Bob, as in Section 1. Earlier, the network gave each member a unique handle or nickname. Suppose Jane's photos are on her network's account. She can tell Bob to go look there if he wants a copy of a photo she has just shown him on her device. The problem is the same as earlier. There is an air gap between their devices. How to convey this information across that gap?

In the prior art, this might often be done by her verbally telling him her nickname, assuming that they have found out that they are on the same social network. De facto, this is an electronic address, similar to an email address or phone number. The manual effort here is equivalent to them not being on the same social network.

There is a level of anonymity afforded by our submission. The data transferred via the interaction does not have to go through the social network's machine. If the interaction is via barcode, this is obvious. But if the interaction uses a server, like a chirp or collision server, where the sender uploads her data, this server can be different from that of the networking website. The separation acts to enhance the privacy.

The votes (perhaps known as "likes" on some websites) that Jane's photos might get on a social network where they are posted can be divided into 2 groups. One are those likes (or dislikes) that were generated by Jane passing an URL to someone nearby via barcode, audio or collision. We might call these "local" votes. The second group are the votes made by visitors coming to her photo pages by other means. These might be termed "non-local" votes.

Hitherto, by default, all vote totals on social networks would likely have been almost entirely non-local.

The social network might show the votes as two numbers. Both for the likes and dislikes, perhaps. Or it might just show one number for the likes and one for the dislikes, as it is currently doing. But in the latter case, it can still internally have the different subtotals.

The local votes are harder to spoof, as seen in the previous section. In this sense, they can potentially be more valuable. Especially because they arose from a person to person interaction, that can be "higher bandwidth" than those votes from generic visitors to the website.

The social network can run analytics against both subtotals, to try to discern any anomalous activity.

12: Photo and Barcode on Different Devices;

Thus far, we considered the case where Jane has a photo that Bob wants. And she makes a barcode, on the same device as the photo. Now consider where Bob has, or rather, will have a photo that Jane wants. But she makes a barcode.

Consider FIG. 1. Jane wants a photo of herself, perhaps with other friends in it [these friends are not shown in FIG. 1]. She can take a selfie. This is popular but very awkward, because she has to hold her phone as far away as possible. One remedy in the prior art is the selfie stick.

Another remedy is to hand her phone to someone nearby and ask him to take a photo. But he might run away with her phone, if he is a stranger.

Another scenario is where there is a professional photographer nearby, Bob. He has a mobile device with a high resolution camera. And possibly associated equipment like a tripod and a set of good lenses. Considered as a camera, his device is better than Jane's mobile device, especially if the latter is a typical cellphone. Bob's business might be to be at places like places like concerts or tourist venues, and to offer to take high quality photos of people.

A typical cellphone with a camera is still primarily a communication device that has a camera for a secondary purpose. But now many cameras have simple wireless communication ability, to easily transmit photos.

The problem addressed in this section is where Jane typically wants a photo of herself, to be taken by someone else, Bob. But if he is a stranger, it is tedious and error prone for him to send it via email to her, if he does not already know her email address.

Figure 8:
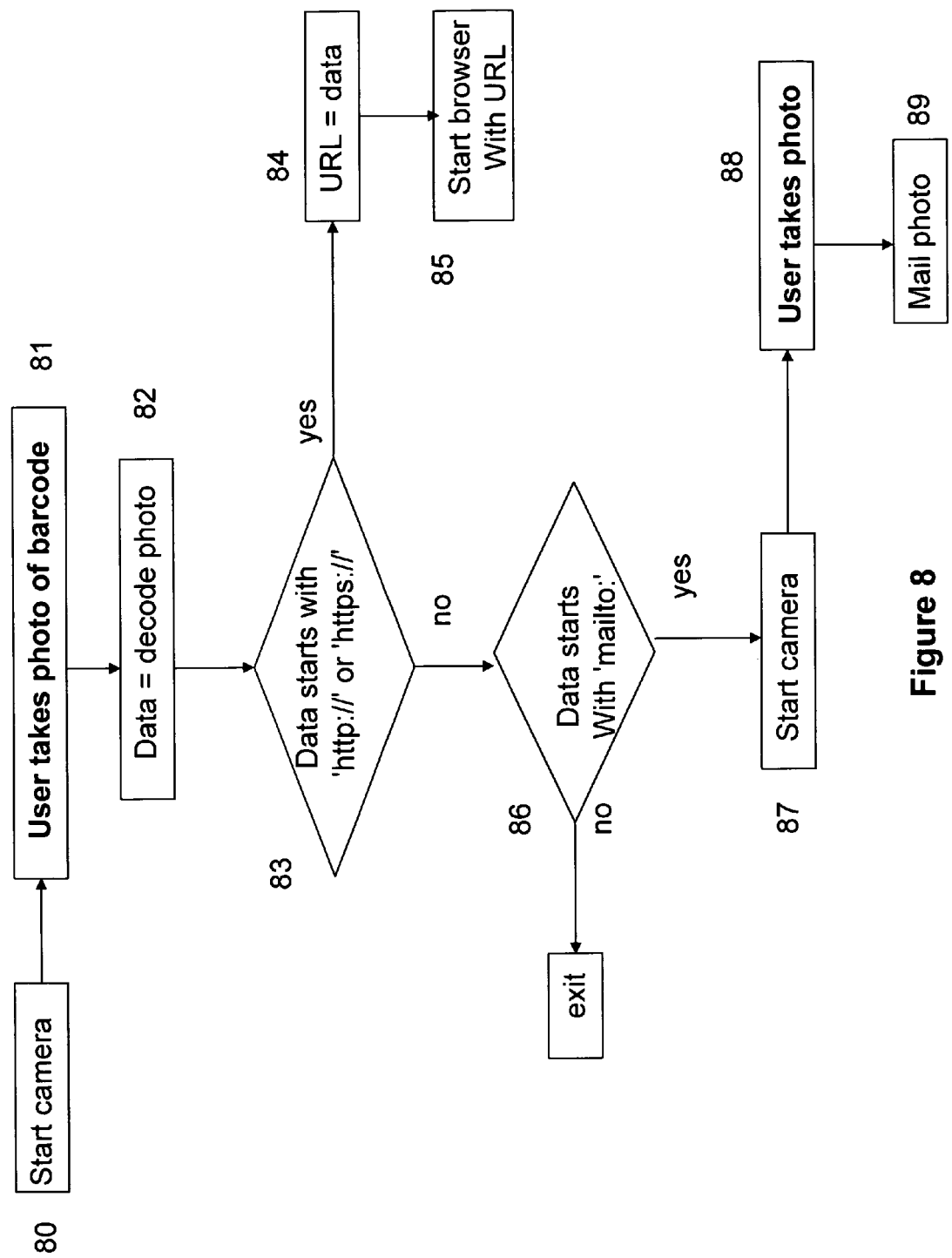
FIG. 8 shows Bob's device taking 2 photos and mailing one to Jane.

She runs a program on her device that encodes her email address in a barcode. First, it can prepend "mailto:" to this address. She shows the barcode on her device screen to Bob. He runs a program on his device that is shown in FIG. 8.

Item 80 starts his camera. Item 81 is where Bob manually takes a photo of the barcode. Item 82 is the decoding of the barcode into its encoded data.

Item 83 is a test. If the data starts with "http://" or "https://", then the data is taken to be an URL in Item 84. Item 85 is where a phone browser is started and loaded with that URL.

Thus far, the steps from Item 80 to Item 85 are the prior art, instantiated in apps available for most mobile phones.

Now return to the test in Item 83. Suppose the answer is no. We go to Item 86. This asks if the data starts with "mailto:". Or another test here is if the data has the character "@". If yes to either, then the data is considered to be an email address. Stripping away "mailto:" if the data starts with it, of course.

A more sophisticated step is to then parse the presumed email address for syntactical validity. For example, if the last field after the "@" is two letters, is the field a valid country code?

If the answer to Item 86 is yes, then we go to Item 87. The device starts its phone, a second time. Item 88 is where Bob manually takes a photo. Presumably containing Jane.

Item 89 is the mailing of this photo to Jane's email address. The photo can be in an attachment. The program can auto-generate some appropriate subject line, though this is not strictly necessary.

If the photo is large enough that Jane's mail server, or intermediate mail relays, are likely to reject the email, then several solutions are possible. For example, Bob's device can copy the photo, via perhaps ftp, to some server on the Internet. His device gets an URL for that photo and send the URL in his email. A refinement can be where his device makes a thumbnail (smaller image), and includes this as an attachment in the email. With a remark that the full image can be gotten if Jane goes to the URL.

It is important to note that Bob has to do only two manual steps in FIG. 8. For emphasis, Items 81 and 88 are shown in bold. Both involve the taking of photos. He does not have to do a clumsy typing of an email address.

Bob might be a non-professional photographer nearby, with his mobile device. And he might be willing to do the above for free. But there is some use of his device's resources. Notably the battery and the storage. Plus also the wireless transmission of the photo. Especially if this goes through his wireless carrier instead of through a WiFi hotspot. (The latter is usually free.)

Suppose Bob is a professional photographer. Or in general, if he expects some compensation. Or if Jane expects or wants to give him a gratuity.

The simplest way is for her to pay him with physical currency.

Another way is to return to the barcode made on her device. She can encode extra information about a wireless payment. Perhaps a so-called micro-payment. Or perhaps involving a cybercurrency.

How this is to be formatted in the barcode data would be by some prior standard, known to the programmers of the steps in FIG. 8. The latter would be altered to extract the payment information.

This section is an alternative to Section 1, where the photo and barcode were on the same device. Now, Bob takes a photo and then makes a barcode on his device. Which Jane scans to do the steps in Section 1, to get the photo. So Bob of this section is Jane of Section 1. But we write this Section because it is a useful and different means, where the photo and barcode are on different devices.

Or, suppose we start with the scenario of Section 1. Jane has a photo already on her device. She shows it to Bob, who wants a copy. In the method of this section, instead of Jane making a barcode with the data in FIG. 2, Bob makes a barcode containing his electronic address, which we can take to be his email address. He shows the barcode to Jane. Her device runs a program that knows already about the image (or images) on its screen. It decodes the barcode to get Bob's address. So, an important point has already been reached. Jane has gotten his contact information.

Her device auto-generates an email with the image attached. It can have various fields of metadata in some format in the body of the email, as per FIG. 2. The email is sent to Bob. He now gets the image he wants, and he has Jane's email address. Bob can have a program running on his device, that connects to his email server, and can detect when this email from Jane is received. This is simpler than Bob logging into his email account and manually scrutinising it for that incoming email from her.

How does his program detect that specific email from Jane? In general, it does not yet know her email address. Like in an earlier section, the data in the barcode he made can be structured to also have a token. Jane's program extracts the token and sends it back in the email to him. So his program scans his emails for the token.

A variant to FIG. 8 is where instead of using a barcode on Jane's device, audio or collisions are used to transmit her electronic address to Bob's device. The modifications to FIG. 8 are minor.

I claim:

1. A system of a mobile device, Alpha, and a mobile device, Beta; where Alpha is controlled by a first user; where Beta is controlled by a second user; where the first user and the second user are different persons; where Alpha shows a first image; where Alpha makes a data containing an Universal Resource Locator (URL) of the first image; where the data furthermore contains an electronic address of the first user; where Alpha displays the data in a barcode as a second image; where Beta has a camera; where Beta scans the barcode with the camera to obtain an image Phi; where Beta decodes Phi to extract the data; where Beta sends an electronic message to the electronic address of the first user; where the electronic message contains an electronic address of the second user.

2. The system of claim 1, where Beta displays the image on a screen of Beta.

3. The system of claim 1, where the electronic address is an email address.

4. The system of claim 1, where the first image depicts a product or service for sale.

5. The system of claim 1, where the data includes a link to an image and a name of an owner of Alpha.

6. The system of claim 1, where the data includes key words describing the first image.

7. The system of claim 6, where Beta uses the key words to aid finding a/the preferences of an owner of Beta.

8. The system of claim 1, where a reply includes an image and a name of an owner of Beta.

9. The system of claim 1, where a reply includes a link to a webpage of an owner of Beta.

10. The system of claim 1, where a reply includes the URL.

11. The system of claim 1, where Alpha sends a message, Gamma, to Beta after Alpha receives a reply from Beta.

12. The system of claim 11, where Gamma has a code for a discount on a price of the product or service represented by the image.

13. The system of claim 1, where Alpha uploads the first image to a server; where the server makes an URL referring to a webpage containing the first image; where the server sends the URL to Alpha; where Alpha makes a data that includes the URL; where the data contains an electronic address; where Alpha displays the data in a barcode; where Beta decodes the barcode.

14. The system of claim 13, where Beta displays the image.

15. The system of claim 13, where Beta sends a reply to the electronic address.

16. A system of a mobile device, Alpha, and a mobile device, Beta; where Alpha shows an image held at a server; where Alpha encodes an URL of a webpage at the server; where Alpha transmits the encoding; where Beta decodes the encoding; where Beta extracts the URL; where Beta displays the webpage; where Beta reviews the image by altering the webpage; where Beta sends the altered webpage to the server.

17. The system of claim 16, where the webpage accepts spoken audio as part or all of the review.

18. The system of claim 16, where the server alters a second webpage showing the image, to include the results of the webpage from Beta.

19. The system of claim 16, where Alpha puts a token into the URL; where Alpha sends the token to the server; where the server extracts a token from the URL sent by Beta; where the server sends a webpage to Beta if the tokens match.

20. A system of a mobile device, Alpha, and a mobile device, Beta; where Beta has a camera; where Alpha encodes an electronic address in a barcode; where Alpha displays the barcode; where Beta takes a photo of the barcode; where Beta decodes the barcode; where Beta takes a second photo; where the second photo does not contain the barcode; where Beta sends a message to the electronic address; where the message contains the second photo.

* * * * *